(12) United States Patent
Deng et al.

(10) Patent No.: US 11,308,443 B2
(45) Date of Patent: Apr. 19, 2022

(54) GOODS SHELF SYSTEM AND METHOD OF MONITORING ITEMS THEREOF

(71) Applicant: BOE TECHNOLOGY GROUP CO., LTD., Beijing (CN)

(72) Inventors: Wei Deng, Beijing (CN); Shijie Cao, Beijing (CN); Hongyan Pei, Beijing (CN); Huawei Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 472 days.

(21) Appl. No.: 16/336,707

(22) PCT Filed: Sep. 30, 2018

(86) PCT No.: PCT/CN2018/108916
§ 371 (c)(1),
(2) Date: Mar. 26, 2019

(87) PCT Pub. No.: WO2019/076193
PCT Pub. Date: Apr. 25, 2019

(65) Prior Publication Data
US 2020/0387853 A1 Dec. 10, 2020

(30) Foreign Application Priority Data
Oct. 19, 2017 (CN) .......................... 201710983035.5

(51) Int. Cl.
*G06Q 10/08* (2012.01)
*G08B 21/18* (2006.01)
(Continued)

(52) U.S. Cl.
CPC ......... *G06Q 10/087* (2013.01); *A47F 5/0043* (2013.01); *G08B 21/182* (2013.01); *H04B 10/1141* (2013.01); *A47F 11/10* (2013.01)

(58) Field of Classification Search
CPC ...... G06Q 10/087; G06Q 20/20; G06Q 20/18; A47F 5/0043; A47F 11/10; A47F 5/00; G08B 21/182; H04B 10/1141; G06M 1/10
See application file for complete search history.

(56) References Cited

U.S. PATENT DOCUMENTS

| 11,042,894 B2 * | 6/2021 | Walden ............... H04W 72/085 |
| 2005/0060246 A1 * | 3/2005 | Lastinger ............. G06Q 10/087 705/28 |

(Continued)

FOREIGN PATENT DOCUMENTS

| CN | 101548283 A | 9/2009 |
| CN | 105681451 A | 6/2016 |

(Continued)

OTHER PUBLICATIONS

First Office Action for CN Appl. No. 201721355731.3, dated Mar. 15, 2018.

(Continued)

*Primary Examiner* — Adnan Aziz
(74) *Attorney, Agent, or Firm* — The Webb Law Firm

(57) ABSTRACT

Embodiments of this disclosure provide a goods shelf system and a method of monitoring items of the goods shelf system. The goods shelf system comprises: a goods shelf comprising a bearing body for bearing an item; a signal transmitting unit located on a side of the bearing body; a plurality of signal receiving units, located on the bearing body, for receiving a signal transmitted by the signal transmitting unit; and a processing unit, electrically connected with the signal receiving unit, for acquiring a storage state of the item on the bearing body according to an signal outputted by the signal receiving unit, wherein one or more of the plurality of signal receiving units shielded by the (Continued)

items are not able to receive the signal transmitted by the signal transmitting unit.

18 Claims, 10 Drawing Sheets

(51) Int. Cl.
    *H04B 10/114* (2013.01)
    *A47F 5/00* (2006.01)
    *A47F 11/10* (2006.01)

(56) References Cited

U.S. PATENT DOCUMENTS

| | | | | |
|---|---|---|---|---|
| 2006/0071774 | A1* | 4/2006 | Brown | G07F 9/026 |
| | | | | 340/522 |
| 2007/0050271 | A1* | 3/2007 | Ufford | G06Q 10/087 |
| | | | | 705/28 |
| 2014/0249928 | A1* | 9/2014 | McMillan | G06Q 30/0267 |
| | | | | 705/14.64 |
| 2014/0316916 | A1 | 10/2014 | Hay | |
| 2016/0026032 | A1* | 1/2016 | Moore | G02F 1/13452 |
| | | | | 382/103 |
| 2017/0220987 | A1* | 8/2017 | Sun | G06Q 10/087 |
| 2017/0303704 | A1* | 10/2017 | Taylor | A47F 1/125 |
| 2017/0351276 | A1* | 12/2017 | Setchell | G01K 1/02 |
| 2018/0114184 | A1* | 4/2018 | Brooks | G01G 19/42 |
| 2018/0242126 | A1* | 8/2018 | Shah | H04W 4/38 |
| 2019/0266566 | A1* | 8/2019 | Blumenau | G06F 16/22 |

FOREIGN PATENT DOCUMENTS

| | | |
|---|---|---|
| CN | 205366540 U | 7/2016 |
| CN | 207558016 U | 6/2018 |
| WO | WO-2017/132546 A1 | 8/2017 |

OTHER PUBLICATIONS

International Search Report and Written Opinion for International Appl. No. PCT/CN2018/108916, dated Dec. 29, 2018.

* cited by examiner

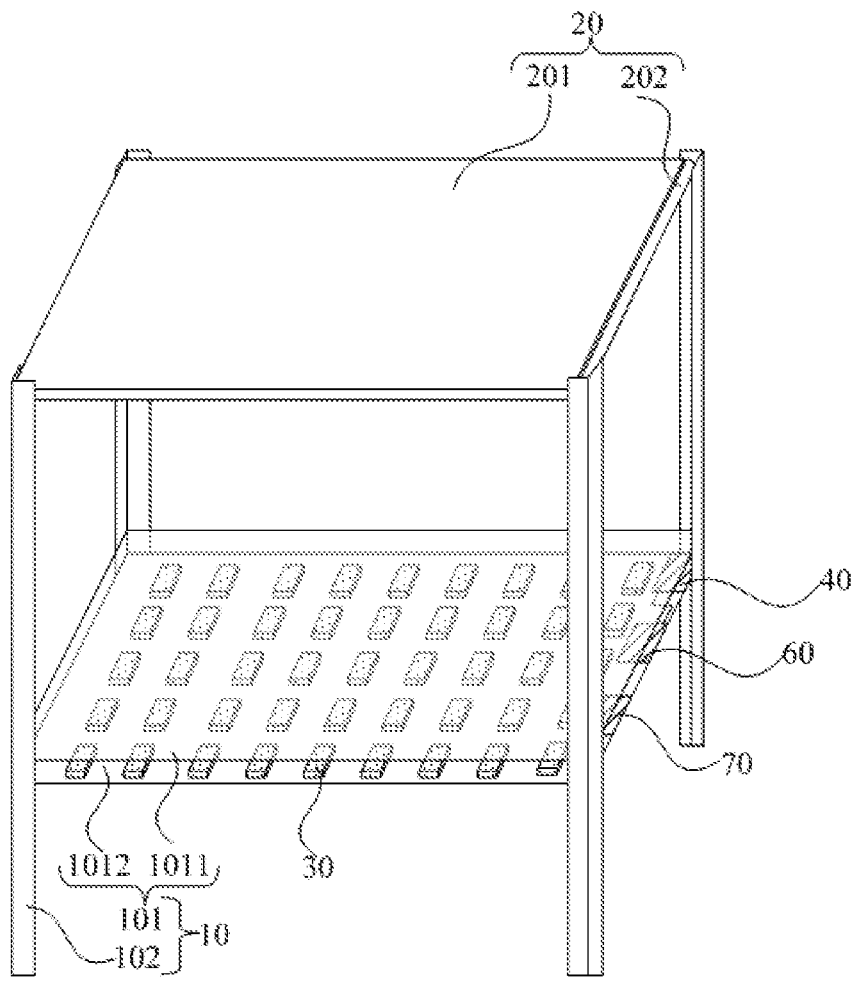

Fig. 7

| Outputting a first magnitude to the processing unit when the signal receiving unit receives the signal transmitted by the signal transmitting unit, and outputting a second magnitude to the processing unit when it does not receive the signal transmitted by the signal transmitting unit | S10 |

| Acquiring, by the processing unit, the storage state of the item on the carrier of the shelf according to the signal outputted by the signal receiving unit | S20 |

Fig. 8

GOODS SHELF SYSTEM AND METHOD OF MONITORING ITEMS THEREOF

CROSS-REFERENCE TO RELATED APPLICATIONS

This application is a U.S. National Stage under 35 U.S.C. § 371 of International Application No. PCT/CN2018/108916 as filed on Sep. 30, 2018, which claims priority to Chinese Patent Application No. 201710983035.5 which was filed on Oct. 19, 2017. The disclosure of each of these applications is hereby incorporated herein by reference in its entirety into this application.

TECHNICAL FIELD

The present invention relates to a goods shelf system and a method of monitoring items thereof.

BACKGROUND

With the progress of the science and technology, people began to pay attention to a new retail mode in the future. In the new retail mode, reducing labor cost or even self-service retail will be the development trend of the retail in the future.

At present, the staff in the supermarket constantly inspect to check whether each item is available on the goods shelves and the items on the goods shelves are sufficient, and so on. In addition, warehousing and shipping areas, such as the e-commerce mall offline warehousing and shipping areas, also require a lot of manpower and material resources to count and organize the items on the goods shelves.

SUMMARY

Embodiments of this disclosure provide a goods shelf system comprising: a goods shelf comprising a bearing body for bearing an item; a plurality of signal transmitting units located on a side of the bearing body; a signal receiving unit, located on the bearing body, for receiving a signal transmitted by the signal transmitting unit; and a processing unit, electrically connected with the signal receiving unit, for acquiring a storage state of the item on the bearing body according to an signal outputted by the signal receiving unit.

In one or more embodiments of this disclosure, the signal transmitting unit comprises a signal transmitting plate, wherein the signal transmitting plate is disposed opposite to the bearing body.

In one or more embodiments of this disclosure, the signal receiving unit is a photosensitive element; the signal transmitting unit is an optical signal transmitting unit.

In one or more embodiments of this disclosure, the signal transmitting plate is a light guide plate; the signal transmitting unit further comprises a light source disposed on a side of the light guide plate.

In one or more embodiments of this disclosure, the goods shelf system further comprises an alarm module electrically connected with the processing unit, and the alarm module is configured to generate alarm information when the quantity of the items stored is less than a predetermined threshold.

In one or more embodiments of this disclosure, the goods shelf system further comprises a communication module for sending the alarm information to a mobile terminal.

In one or more embodiments of this disclosure, the communication module is further used for sending identification information identifying the goods shelf and the quantity of the items stored on the goods shelf to the mobile terminal.

In one or more embodiments of this disclosure, a bracket is disposed between the bearing body and the signal transmitting plate, and the bearing body and the signal transmitting plate are fixed by the bracket.

In one or more embodiments of this disclosure, the bearing body comprises a support and a circuit board; the signal receiving unit is disposed on the circuit board, and the circuit board is disposed on a side of the support away from the signal transmitting plate.

In one or more embodiments of this disclosure, there are a plurality of signal receiving units arranged on the bearing body in an array.

In one or more embodiments of this disclosure, the bearing body is a plate-shaped bearing body or mesh-shaped bearing body.

The embodiments of this disclosure further provide a method of monitoring items of the above goods shelf system, comprising: outputting a first magnitude to the processing unit when the signal receiving unit receives the signal transmitted by the signal transmitting unit, and outputting a second magnitude to the processing unit when the signal transmitted by the signal transmitting unit is shielded by the items on the bearing body; and acquiring, by the processing unit, the storage state of the item on the bearing body of the goods shelf according to the signal outputted by the signal receiving unit.

In one or more embodiments of this disclosure, the method further comprises when the quantity of the items stored is less than the predetermined threshold, generating by the alarm module, alarm information.

In one or more embodiments of this disclosure, acquiring, by the processing unit, the storage state of the item on the bearing body of the goods shelf according to the signal outputted by the signal receiving unit comprises: after the processing unit determines that a tally action occurs, calculating the quantity of the items stored on the bearing body according to the signal outputted by the signal receiving unit, wherein determining whether or not a tally action occurs comprises: acquiring the first magnitude or the second magnitude outputted by the signal receiving units in a preset area range on the bearing body near an entrance of the goods shelf, and summing them to obtain a total magnitude; and determining whether a tally action occurs according to a result of comparison between the total magnitude and an initial total magnitude.

In one or more embodiments of this disclosure, the method further comprises: acquiring, before the tally action, the first magnitude outputted by the signal receiving units in the preset area range on the bearing body near the entrance of the goods shelf, to obtain the initial total magnitude.

Alternatively, in one or more embodiments of this disclosure, acquiring, by the processing unit, the storage state of the item on the bearing body of the goods shelf according to the signal outputted by the signal receiving unit comprises: after the processing unit determines that a tally action occurs, calculating the quantity of the items stored on the bearing body according to the signal outputted by the signal receiving unit; wherein determining whether or not a tally action occurs comprises: determining whether or not a tally action occurs according to a change trajectory of the signal receiving unit that outputs the second magnitude on the bearing body.

In one or more embodiments of this disclosure, the method further comprises calculating the quantity of the items stored on the bearing body comprises: acquiring the quantity $n_t$ of the signal receiving units that output the first magnitude on the bearing body; calculating the quantity $m_t$ of the item stored on the bearing body according to the equation $$m_t = \frac{(N - n_t)M}{N - n_0},$$

where M is a quantity of the items when the number of the item stored on the bearing body reaches a maximum, $n_0$ is the quantity of the signal receiving units that output the first magnitude when the number of the item stored on the bearing body reaches the maximum, and N is a quantity of the signal receiving units on the bearing body.

In one or more embodiments of this disclosure, the method further comprises: after obtaining the quantity of the items stored on the bearing body through calculation, comparing the quantity calculated at this time with the quantity before the tally action occurs this time, to obtain a change in the quantity of the items stored on the bearing body after the tally action occurs this time.

In one or more embodiments of this disclosure, after obtaining the quantity of the items stored on the bearing body through calculation, comparing the quantity calculated at this time with the quantity before the tally action occurs this time, to obtain a change in the quantity of the items stored on the bearing body after the tally action occurs this time, comprises: after obtaining the quantity of the items stored on the bearing body through calculation, comparing the quantity calculated at this time with an initial quantity, to obtain a change in the quantity of the items stored on the bearing body after the tally action occurs this time, wherein the initial quantity is the quantity of the items stored on the bearing body before the tally action occurs this time; and assigning the quantity at this time to the initial quantity.

In one or more embodiments of this disclosure, the method further comprises: sending, by the communication module, the alarm information generated by the alarm module to the mobile terminal.

In one or more embodiments of this disclosure, the method further comprises: sending the identification information identifying the goods shelf and the quantity of the items stored on the goods shelf to the mobile terminal.

BRIEF DESCRIPTION OF THE DRAWINGS

To describe the technical solutions in the embodiments of this disclosure or in the prior art more clearly, the accompanying drawings to be used in the description of the embodiments or the prior art are briefly discussed in the following. Evidently, the accompanying drawings are only some embodiments of this disclosure, and persons of ordinary skill in the art may also obtain other drawings according to these accompanying drawings without creative efforts.

FIG. 4b is a top view seen from above the item to the bearing body, directed to FIG. 4a;

FIG. 4c is a sectional schematic diagram in the AA' direction of FIG. 4a;

FIG. 7 is the sixth schematic diagram showing a goods shelf system provided by this disclosure;

FIG. 8 is the first schematic diagram showing a flow of monitoring items of a goods shelf system provided by this disclosure;

FIG. 9a is a schematic diagram showing an entry of a tally device into the goods shelf on the basis of FIG. 4a;

FIG. 9b is a top view seen from above the item to the bearing body, directed to FIG. 9a;

DETAILED DESCRIPTION

The technical solutions in the embodiments of this disclosure are clearly and completely described in the following with reference to the accompanying drawings in the embodiments of this disclosure. Evidently, the embodiments in the following description are only a part rather than all of the embodiments of this disclosure. Based on the embodiments in this disclosure, all other embodiments obtained by persons of ordinary skill in the art without creative effects shall fall within the protection scope of this disclosure.

Figure 1:
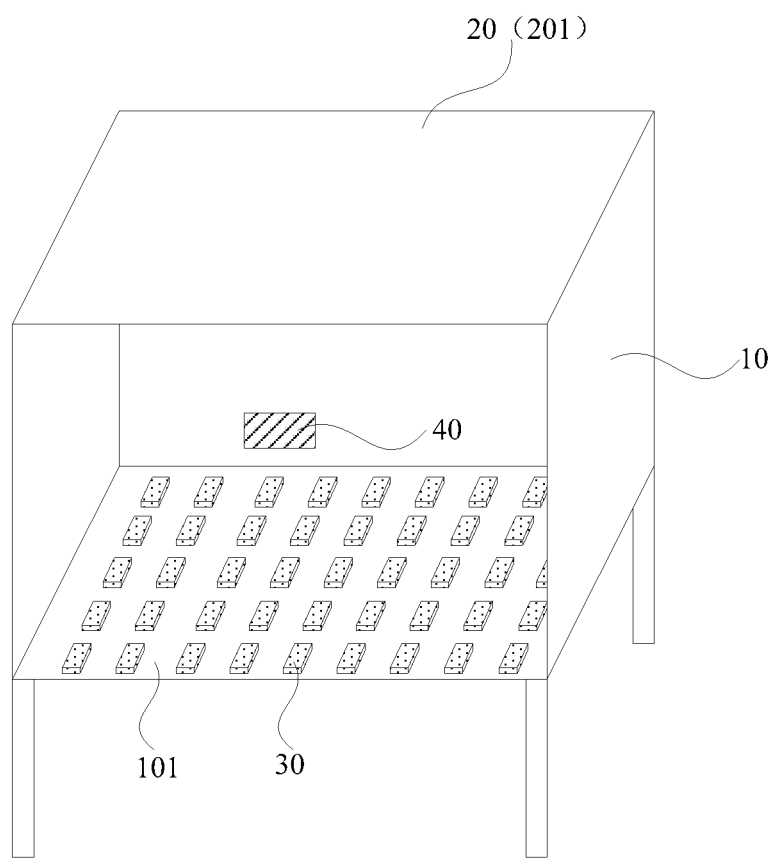
FIG. 1 is the first schematic diagram showing a goods shelf system provided by this disclosure.
Figure 2:
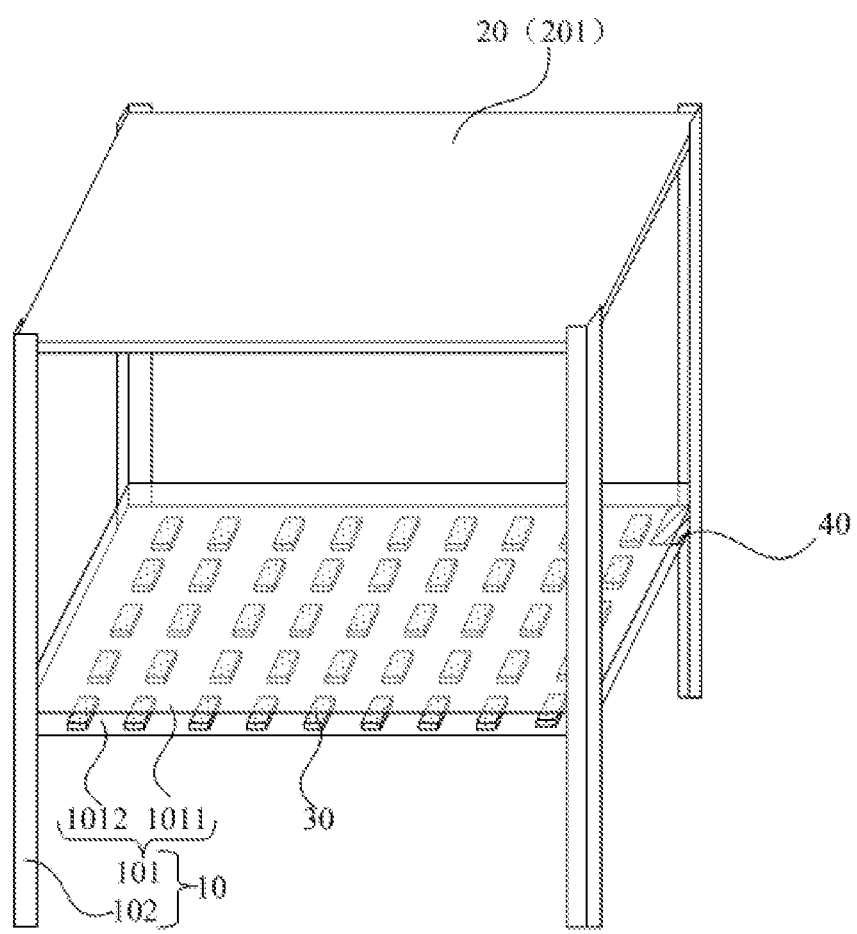
FIG. 2 is the second schematic diagram showing a goods shelf system provided by this disclosure.

The embodiments of this disclosure provide a goods shelf system, as shown in FIG. 1 and FIG. 2, comprising: a goods shelf 10, a signal transmitting unit 20, a signal receiving unit 30 and a processing unit 40. Among them, the goods shelf 10 comprises a bearing body 101 that can bear items, wherein the items are generally opaque, for example, goods to be sold can be placed on the bearing body 101. The signal transmitting unit 20 is located on a side of the bearing body, with a certain distance from the bearing body 101, and the signal transmitting unit 20 is used for transmitting a signal. The signal transmitted by the signal transmitting unit 20 can be optical signal, electrical signal, acoustic signal and so on. The signal receiving unit 30 is used for receiving the signal transmitted by the signal transmitting unit 20. The signal receiving unit 30 is disposed on the bearing body 101 of the goods shelf 10. When the signal transmitted by the signal transmitting unit 20 is received, the signal receiving unit 30 will have an electrical change and outputs the electrical change to the processing unit 40. The processing unit 40 is electrically connected with the signal receiving unit 30 (the connection relation is not identified in the figure), for acquiring a storage state of the item on the bearing body 101 according to the signal outputted by the signal receiving unit 30. The storage state of the item for example can be, whether the item is present in an area on the bearing body 101, or for example, a quantity of the items stored, etc.

It should be noted that, firstly, the goods shelf 10 can be a single-layer goods shelf 10, or a multilayer goods shelf 10. When the goods shelf is a multilayer goods shelf 10, there can also be a plurality of respective bearing bodies 101 arranged in a stacked manner.

Secondly, the signal receiving unit 30 is disposed on the bearing body 101, but it is not limited to direct disposition on the bearing body 101, and it can be also indirectly disposed on the bearing body 101, for example, a signal receiving plate including the signal receiving unit 30 is disposed on the bearing body 101.

The signal receiving unit 30 can be disposed above the bearing body 101, or blow the bearing body 101, so long as the signal transmitted by the signal transmitting unit 20 can be received when not being shielded by an item.

Thirdly, as compared to the case where the signal receiving unit 30 does not receive the signal transmitted by the signal transmitting unit 20 due to shielded by the item, when the signal receiving unit 30 receives the signal transmitted by the signal transmitting unit 20 due to not shielded by the item, it can output different magnitudes.

Fourthly, since the signal transmitting unit 20 is fixed on the goods shelf 10, its position allows the signal emitted thereby to be transmitted to the bearing body 101 so that those signal receiving units 30 not shielded by the item can receive the signal transmitted by the signal transmitting unit 20. For example, for the position where an item is stored on the bearing body 101, since the item covers the signal receiving unit 30, the signal receiving unit 30 covered by the item cannot receive the signal transmitted by the signal transmitting unit 20, while for the position where no item is stored on the bearing body 101, the signal receiving unit 30 can receive the signal transmitted by the signal transmitting unit 20. The electrical changes produced in these two cases are different, and the processing unit 40 can learn whether or not there is an item stored on the bearing body 101 according to the electrical change.

Fifthly, the processing unit 40 is fixed on the goods shelf 10, and its position can be rationally set according to its connection relation with the signal receiving unit 30. The processing unit 40 for example can be a processor, and the processor can be a central processing unit (CPU) or other forms of processing unit with data processing capabilities and/or program execution capabilities, such as Field Programmable Gate Array (FPGA) or tensor processing unit (TPU).

Sixthly, those skilled in the art would appreciate that the goods shelf system further comprise a power line for supplying power to the goods shelf system.

The embodiments of this disclosure provide a goods shelf system, wherein by arranging the signal transmitting unit 20, the signal receiving unit 30 and the processing unit 40, and enabling the signal receiving unit 30 to be disposed on the bearing body 101 for bearing items of the goods shelf 10, the processing unit 40 can learn the storage state of the item on the goods shelf 10 based on the signal outputted by the signal receiving unit 30, so as to save manpower and material resources required for the inspection of the storage states of the items.

In one or more embodiments of this disclosure, there are a plurality of signal receiving units 30 arranged in an array on the bearing body 101.

Since all the signal receiving units 30 are connected with the processing unit 40, the signal receiving units 30 arranged in an array can be easily wired and electrically connected with the processing unit 40, and the signal receiving units 30 arranged in an array can facilitate the determination as to the position information of each signal receiving unit 30. The arrangement in an array, for example, can be the arrangement in a rectangular array, a triangular array, a circular array, and so on. In one embodiment, the arrangement in a rectangular array is adopted, which makes it more convenient to calculate an area of the signal receiving units 30 covered and uncovered by the items, so as to acquire the quantity of the items stored and improve the processing speed and real-time performance.

In one or more embodiments of this disclosure, as shown in FIG. 1 and FIG. 2, the signal transmitting unit 20 comprises a signal transmitting plate 201 disposed opposite to the bearing body 101.

It can be understood that, a spacing between the signal transmitting plate 201 and the bearing body 101 is sufficient to accommodate an item.

In addition, the bearing body 101 in each layer corresponds to a signal transmitting plate 201. When the goods shelf 10 is a multilayer goods shelf, the signal transmitting plate 201 in this layer can be disposed close to the bearing body 101 in its upper layer.

By disposing the signal transmitting plate 201 opposite to the bearing body 101, the signal transmitted by the signal transmitting plate 201 can be vertically launched to the bearing body 101. Thus, in a space for storing items formed by the signal transmitting plate 201 and the bearing body 101, the signal receiving unit 30 shielded by the item cannot receive the signal transmitted by the signal transmitting plate 201, while the signal receiving unit 30 not shielded by the item can receive the signal transmitted by the signal transmitting plate 201, thus the storage state of the item on the bearing body 101 of the goods shelf 10 can be acquired according to the signal outputted by all signal receiving units 30 on the bearing body 101. Among them, the signal transmitting plate 201 can transmit the signal in the whole surface, so that the signal transmitted by the signal transmitting plate 201 can be received when any position on the bearing body 101 is not shielded by the item.

In one or more embodiments of this disclosure, the signal receiving unit 30 is a photosensitive element and the signal transmitting unit 20 is an optical signal transmitting unit.

Among others, the photosensitive element can be photoresistor, photosensitive diode and the like.

There are a variety of photosensitive elements that can be selected widely, so photosensitive elements with better efficiency and lower cost can be selected.

Figure 3:
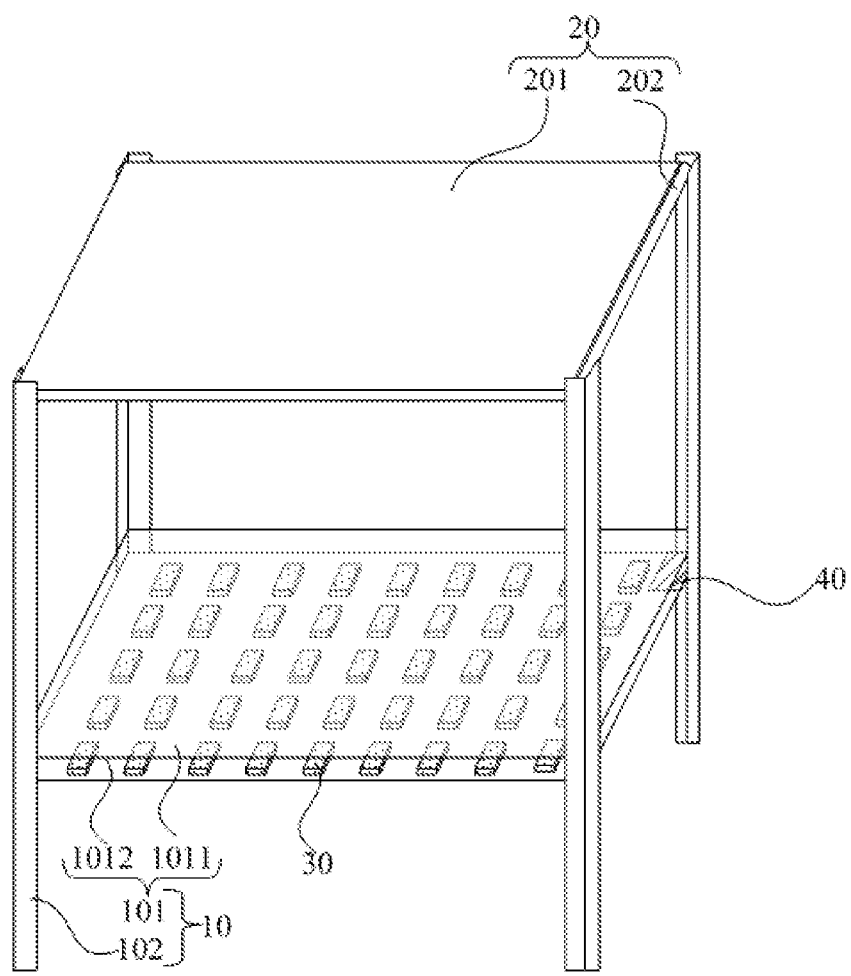
FIG. 3 is the third schematic diagram showing a goods shelf system provided by this disclosure.

In one or more embodiments of this disclosure, as shown in FIG. 3, the signal transmitting plate 201 is a light guide plate. In this case, the signal transmitting unit 20 further comprises a light source 202 disposed on a side of the light guide plate.

Specifically, the light source 202 can be a strip light source for example. The light emitted by the light source 202 passes through the light guide plate and becomes a surface light source, and a side of the light guide plate near the bearing body 101 is a light emission side. The surface light source illuminates downwards the bearing body 101, and the light emission of the surface light source is more uniform.

Figure 4A:
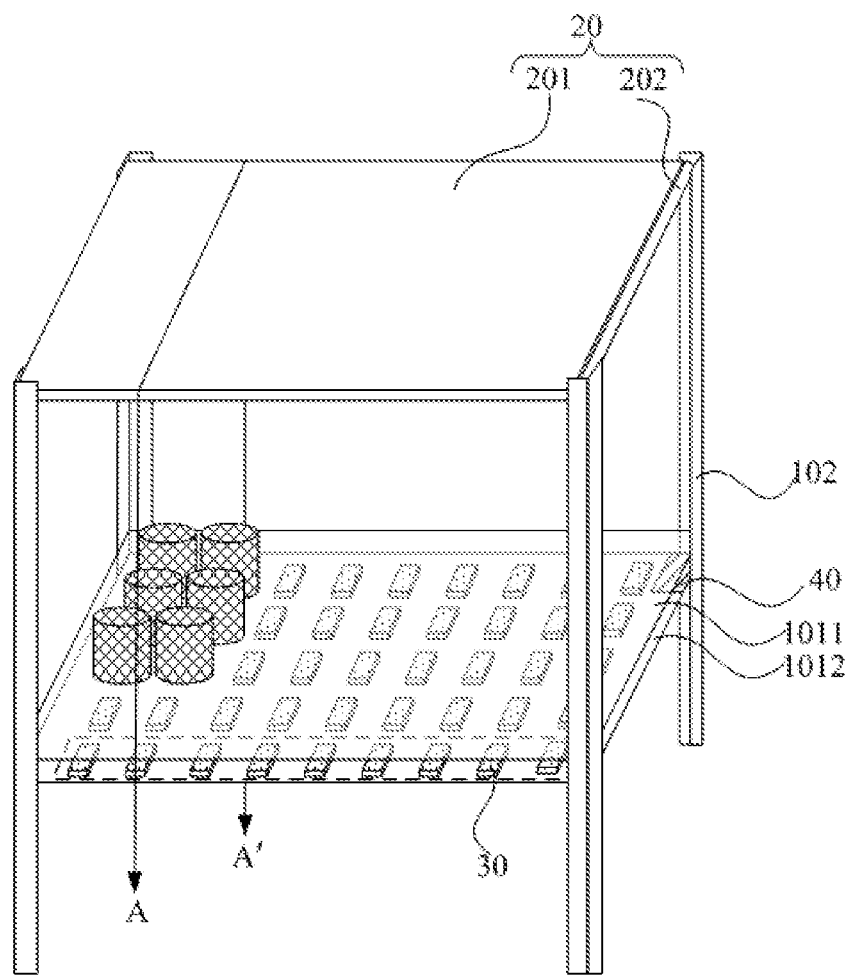
FIG. 4a is a schematic diagram showing a goods shelf system provided by this disclosure and items placed on the goods shelf system.
Figure 4B:
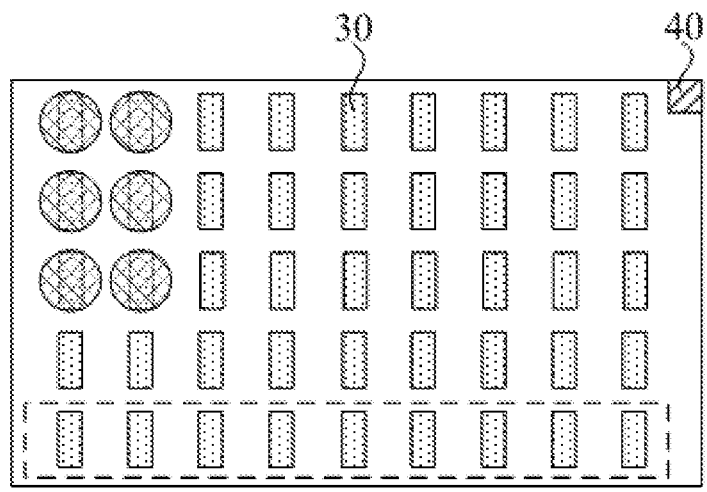
Figure 4C:
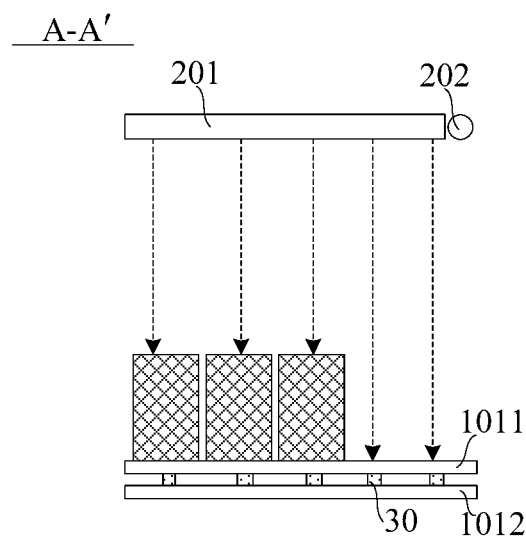

As shown in FIG. 4a, FIG. 4b and FIG. 4c, at the position where an item is stored on the bearing body 101, the light illuminates the item, so that the photosensitive element covered by the item cannot receive the light, and at the position where no item exists on the bearing body 101, the light illuminates the photosensitive element. Taking photoresistor as the photosensitive element for example, when the photosensitive element does not receive the light illumination, its resistance is larger, and when the light illumination is received, its resistance becomes smaller.

It could be understood that, how the light guide plate and the light source 202 are fixed is not restricted, as long as the two do not move relative to each other. In addition, items placed on the goods shelf 10 can be opaquely packed items.

In the case that the signal receiving unit 30 is a photosensitive element, the light guide plate in combination with the light source 202 results in simple structure and lower cost.

Figure 5:
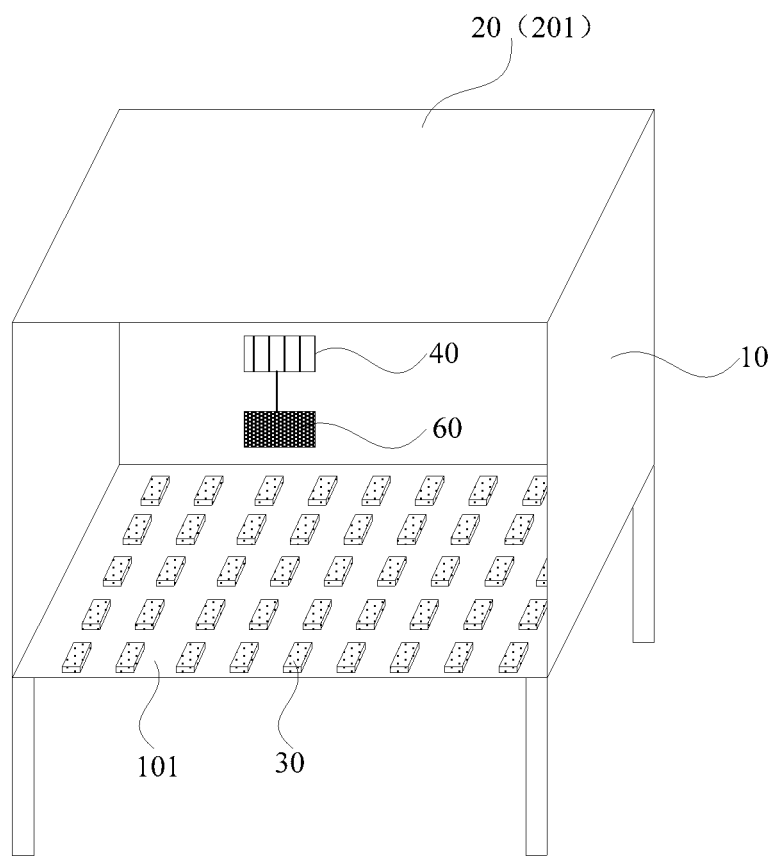
FIG. 5 is the fourth schematic diagram showing a goods shelf system provided by this disclosure.
Figure 6:
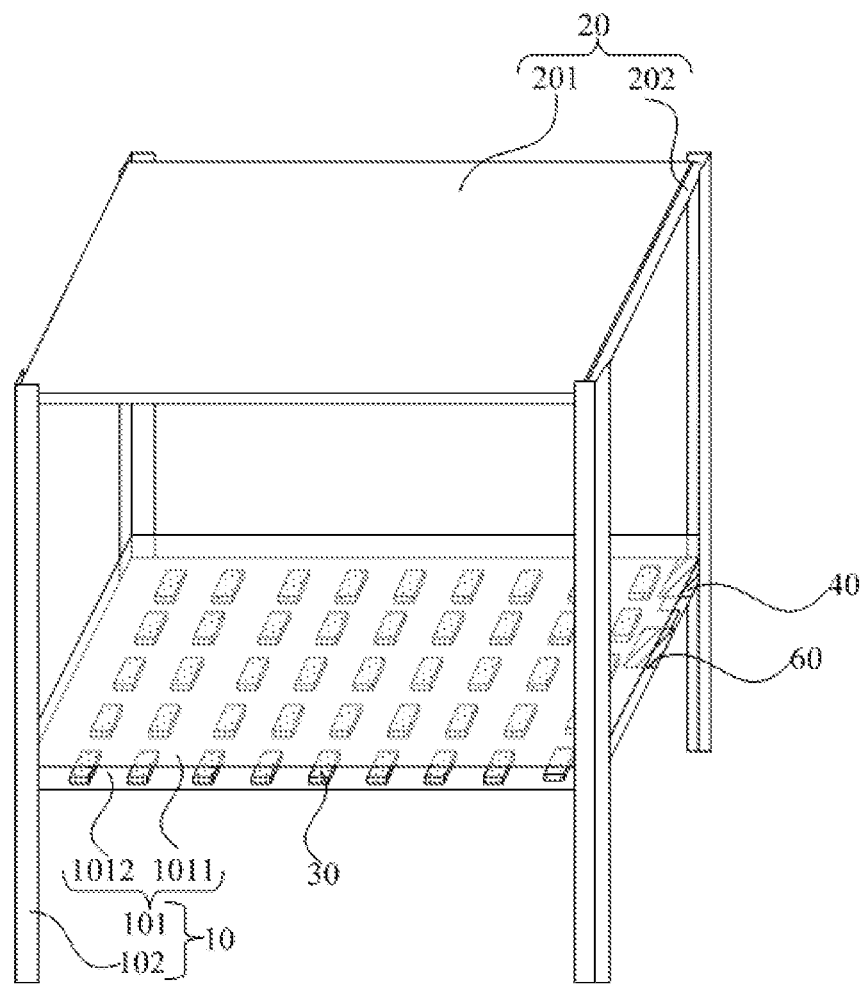
FIG. 6 is the fifth schematic diagram showing a goods shelf system provided by this disclosure.

In one or more embodiments of this disclosure, as shown in FIG. 5 and FIG. 6, the goods shelf system further comprises an alarm module 60. The alarm module 60 is electrically connected with the processing unit 40, and is configured to generate alarm information when the quantity of items stored is less than a predetermined threshold, wherein the storage state of the item includes the quantity of the items stored.

Specifically, when the goods shelf 10 is a multilayer goods shelf 10, the alarm information can be generated based on a respective comparison of the quantity of the items stored on each layer with the predetermined threshold, and the alarm information can be generated also based on the comparison of the quantity of the items stored on the multiple layers of the goods shelf 10 with the predetermined threshold. Also, the predetermined threshold can be set according to the actual needs, a different threshold can be set for each layer of the goods shelf 10, and the set threshold can be adjusted in real time according to actual selling situations and the demands for the item.

In addition, the alarm module 60 is fixed on the goods shelf 10, and its specific position can be set according to actual situations. The alarm information generated by the alarm module 60 is not recited in its form, for example, an out-of-stock state can be broadcast through a loudspeaker, and so on.

In the embodiment of this disclosure, generating the alarm information by the alarm module can remind the staff of the immediate out-of-stock state of the item on the goods shelf 10, so as to carry out early warning.

In one or more embodiments of this disclosure, as shown in FIG. 7, the goods shelf system further comprises a communication module 70, for sending the alarm information generated by the alarm module 60 to the mobile terminal. The communication module 70 is implemented by at least one of processor, transmitter, receiver, amplifier, AD/DA converter or antenna.

It would be appreciated that, when the processing unit 40 has a control function, the communication module 70 is connected with the processing unit 40 to send the alarm information to the mobile terminal under the control of the processing unit 40. Otherwise, the goods shelf system may comprise a control unit connected with the alarm module 60, communication module 70, etc., to control the communication module 70 to send the alarm information generated by the alarm module 60 to the mobile terminal.

Since mobile terminals including mobile phones, IPADs are very popular, by sending the alarm information to the mobile terminal, the staff can also get timely warning prompts even if they leave the work area, so that they can replenish the item timely.

In one or more embodiments of this disclosure, the communication module 70 is also used for sending the identification information identifying the goods shelf 10 and the quantity of the items stored on the goods shelf to the mobile terminal.

Specifically, when goods shelf 10 is a multilayer goods shelf 10, unique identification information can be assigned to each layer of the goods shelf 10, and the identification information for each layer and the quantity of the items stored in that layer (i.e., the item on the bearing body 101 of that layer) are sent to the mobile terminal. Alternatively, unique identification information can be assigned to a goods shelf 10, and the identification information of the goods shelf 10 and the quantity of items stored on each layer of the goods shelf 10 (i.e., each bearing body 101) are sent to the mobile terminal. Alternatively, unique identification information can be also assigned to a goods shelf 10, and the identification information of the goods shelf 10 and the quantity of items stored on all layers of the goods shelf 10 (i.e., all bearing bodies 101) are sent to the mobile terminal.

In the embodiment of this disclosure, by sending the identification information of the goods shelf 10 and the quantity of items stored on the goods shelf 10 to the mobile terminal, the staff can keep abreast of the quantity of items stored on each goods shelf 10, or even on each layer of the goods shelf 10.

Alternatively, as shown in FIG. 2, FIG. 3, FIG. 6 and FIG. 7, a bracket 102 is disposed between the bearing body 101 and the signal transmitting plate 201, and the bearing body 101 and the signal transmitting plate 201 are fixed by the bracket 102. In this way, the goods shelf system in this disclosure has a simple structure and is easy to implement.

It would be appreciated that, the bracket 102 belongs to a part of the goods shelf 10.

Alternatively, the bearing body 101 comprises a support 1011 and a circuit board 1012. The signal receiving unit 30 is disposed on the circuit board 1012, and the circuit board 1012 is located on a side of the support 1011 away from the signal transmitting plate 201.

The signal receiving unit 30 can be disposed on a side of the circuit board 1012 near the support 1011. Depending on the difference in the signal transmitted by the signal transmitting plate 201, the material of the support 1011 can enable the signal transmitted by the signal transmitting plate 201 to transmit therethrough, thereby transmitted to the circuit board 1012. When the signal transmitted by the signal transmitting plate 201 is an optical signal, the support 1011 can be for example a transparent support 1011 such as glass, plastic. In one or more embodiments, the support 1011 is plate-shaped, and therefore the bearing body 101 is also a plate-shaped bearing body. In addition, in one or more embodiments, the support 1011 can be mesh-shaped, and therefore the bearing body 101 is also a mesh-shaped bearing body, which has an opening at the corresponding position of the signal receiving unit 30, to enable the signal transmitted by the signal transmitting plate 201 to transmit therethrough, thereby launching to the signal receiving unit 30 on the circuit board 1012.

On the one hand, by providing the support 1011 and the circuit board 1012 at the same time, the item located on the support 1011 will not be in contact with the signal receiving unit 30, which can play the role of protecting the signal receiving unit 30, to improve the service life of the signal receiving unit 30. On the other hand, by disposing the signal receiving unit 30 on the circuit board 1012, the processing unit 40 can also be disposed on the circuit board 1012. In this way, when making the circuit board 1012, the electrical connection between the signal receiving unit 30 and the processing unit 40 can be easily achieved through the corresponding signal lines.

The embodiments of this disclosure further provide a method of monitoring items of the goods shelf system, as shown in FIG. 8, comprising:

S10, outputting a first magnitude to the processing unit 40 when the signal receiving unit 30 receives the signal transmitted by the signal transmitting unit 20, and outputting a second magnitude to the processing unit 40 when it does not receive the signal transmitted by the signal transmitting unit 20.

Here, when the signal receiving unit 30 does not receive the signal transmitted by the signal transmitting unit 20, the signal receiving unit 30 outputs the first magnitude that can be measured according to the characteristics of the device itself. When the signal receiving unit 30 receives the signal transmitted by the signal transmitting unit 20, the signal receiving unit 30 will have an electrical change, so as to output the second magnitude that can reflect the electrical change.

Among others, the first magnitude and the second magnitude can be resistance, current, voltage and other electrical characteristic values.

It would be appreciated that, the first and second magnitudes are electrical characteristic values of the same type.

S11, acquiring, by the processing unit 40, the storage state of the item on the bearing body 101 of the goods shelf 10 according to the signal outputted by the signal receiving unit 30.

The embodiments of this disclosure provide a method of monitoring items of a goods shelf system. When the signal receiving unit 30 is not shielded by the item, it outputs the first magnitude due to receiving the signal transmitted by the signal transmitting unit 20; when the signal receiving unit 30 is shielded by the item, it outputs the second magnitude due to not receiving the signal transmitted by the signal transmitting unit 20, such that the processing unit 40 can acquire the storage state of the item on the goods shelf 10 according to the magnitude outputted by the signal receiving unit 30. For example, it is possible to learn the presence or not of an item in an area of the bearing body 101, or to calculate more accurately the quantity of the items stored, etc., so as to save manpower and material resources required for the inspection of the quantity of the items stored.

In one or more embodiments of this disclosure, the storage state of the item includes the quantity of the items stored. The method further comprises: when the quantity of the items stored is less than the predetermined threshold, the alarm module 60 generates alarm information.

Specifically, when the goods shelf 10 is a multilayer goods shelf 10, the alarm information can be generated based on a respective comparison of the quantity of the items stored on each layer with the predetermined threshold, and the alarm information can be generated also based on the comparison of the quantity of the items stored on all layers of the goods shelf 10 with the predetermined threshold.

Generating the alarm information by the alarm module can remind the staff of the immediate out-of-stock state of the item on the goods shelf 10, so as to carry out early warning.

In one or more embodiments of this disclosure, acquiring, by the processing unit 40, the storage state of the item stored on the bearing body 101 of the goods shelf 10 according to the signal outputted by the signal receiving unit 30 comprises: after the processing unit 40 determines that a tally action occurs, calculating the quantity of the items stored on the bearing body 101 of the goods shelf 10 according to the signal received by the signal receiving unit 30.

Determining that a tally action occurs comprises: acquiring the first magnitude or the second magnitude outputted by all the signal receiving units 30 in a preset area range (refer to dashed boxes in FIG. 4*a* and FIG. 4*b*) on the bearing body 101 near an entrance of the goods shelf 10, and summing them to obtain a total magnitude; comparing the total magnitude with an initial total magnitude; if there is a difference between the total magnitude and the initial total magnitude (that is, the difference is not 0), and after a preset time the total magnitude is equal to the initial total magnitude, then determining that a tally action occurs.

In one or more embodiments of this disclosure, the method further comprises: acquiring the first magnitude outputted by all the signal receiving units 30 in the preset area range on the bearing body 101 near the entrance of the goods shelf 10, to obtain the initial total magnitude.

Figure 9A:
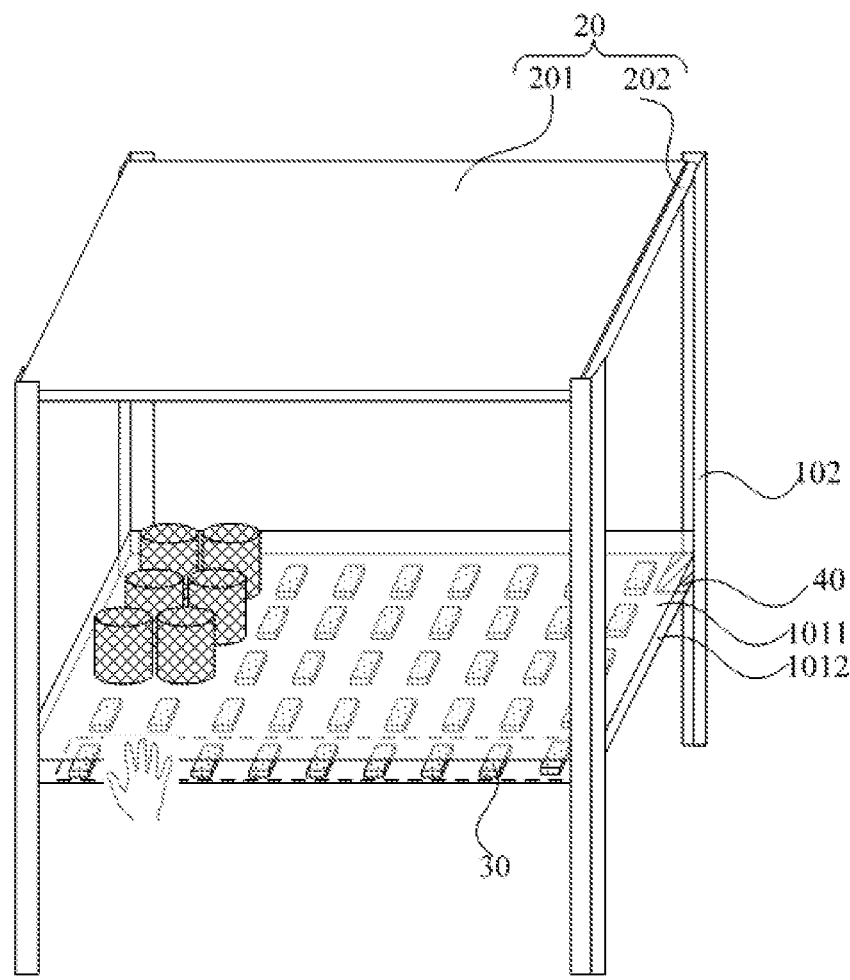
Figure 9B:
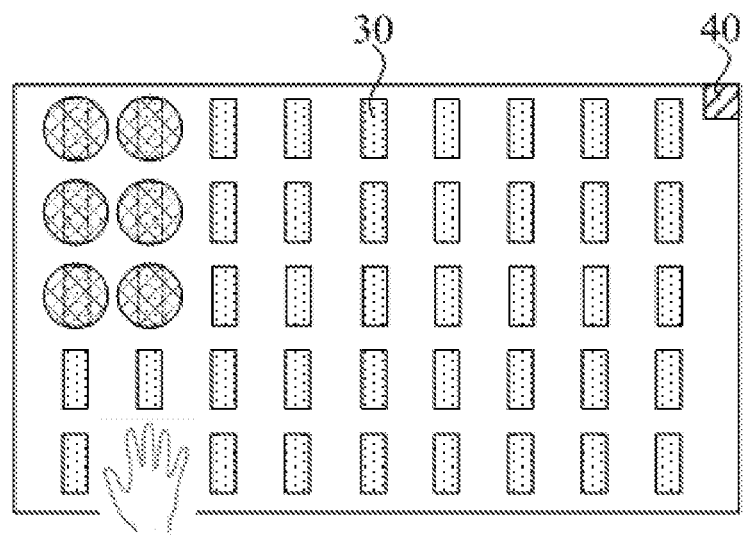
Figure 9C:
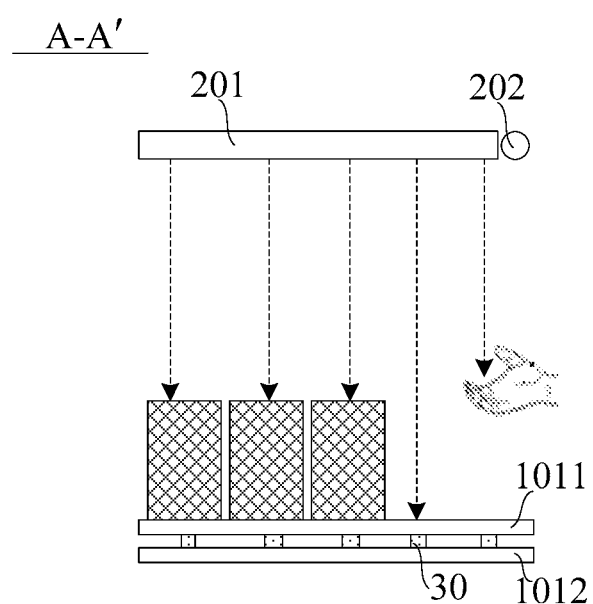
FIG. 9c is a schematic diagram showing an entry of a tally device into the goods shelf on the basis of FIG. 4c.

By taking photoresistor as an example of the signal receiving unit 30, in the case of no entry of a tally device (such as human hand, robotic arm, etc.) into the goods shelf 10, the photoresistors located in the preset area range on the bearing body 101 at the entrance of the goods shelf 10 are all within the light illumination (as shown in FIGS. 4*a*-4*c*) and all of them output the first magnitude. The first magnitude is resistance, or a voltage or current value that can reflect the resistance. At this time the total resistance of the photoresistors in the preset area range is the smallest, as the initial total magnitude. When a tally device enters the goods shelf 10, the light will illuminate the tally device, and since the tally device is generally opaque, part of the photoresistors at the entrance that are shielded by the tally device cannot receive light illumination (as shown in FIGS. 9*a*-9*c*) and output the second magnitude. The second magnitude is resistance, or a voltage or current value that can reflect the change in the resistance. Thus, the total resistance of the photoresistors in the preset area range is larger than the initial total magnitude. When the tally device is pulled out of the goods shelf 10, the total resistance of the photoresistors within the preset area range becomes the smallest, and is equal to the initial total magnitude. In this way, the occurrence of the tally action can be detected by detecting a change in the total resistance of the photoresistors in the preset area range on the bearing body 101 at the entrance of the goods shelf 10.

In this disclosure, the action of taking out an item of the goods shelf 10 or putting back the item is called tally.

It should be noted that, for each layer of the goods shelf 10, it constitutes a space for storing items. The space has multiple sides, one of which is used as a must-pass-port to take out or put back items, and is called an entrance of the goods shelf 10.

When setting the preset area range on the bearing body 101 at the entrance of the goods shelf 10 (refer to the dashed boxes in FIG. 4*a* and FIG. 4*b*), no items are placed within the preset area range. According to the density of the signal receiving units 30, all signal receiving units 30 in the preset area range near the entrance of the goods shelf 10, for example, can be a row of signal receiving units near the entrance of the goods shelf 10, or can be two rows or even more rows.

The preset area range can be rationally set according to specific situations, so long as it can be used for determining whether or not a tally device enters.

Alternatively, in one or more embodiments of this disclosure, the processing unit 40 acquires the storage state of the item on the bearing body 101 of the goods shelf 10 according to the signal outputted by the signal receiving unit 30, comprising: after the processing unit 40 determines that the tally action occurs, calculating the quantity of the items stored on the bearing body 101 of the goods shelf 10 according to the signal outputted by the signal receiving unit 30.

Determining whether or not a tally action occurs comprises: determining whether or not a tally action occurs according to a change trajectory of the signal receiving unit 30 that outputs the second magnitude on the bearing body 101.

Still use the photoresistor as an example of the signal receiving unit 30, when a tally device enters the goods shelf 10, the light transmitted by the signal transmitting unit 20 will illuminate the tally device, so that the photoresistors shielded by the tally device output the second magnitude due to not receiving the illumination. Further, as the tally device moves, the shielded photoresistors also change. Thus, whether or not a tally action occurs can be determined according to the change trajectory of the shielded photoresistors.

By calculating the quantity of the items stored on the goods shelf 10 after conforming the occurrence of the tally action, computational complexity can be reduced, thus reducing the needs for the performance of the processing Unit 40.

Based on the above, calculating the quantity of the items stored on the bearing body 101 of the goods shelf 10 comprises: acquiring the quantity $n_t$ of the signal receiving units 30 which output the first magnitude, on the bearing body 101 of the goods shelf 10, and calculating the quantity $m_t$ of the item stored on the bearing body 10 of the goods shelf 101 through the equation $$m_t = \frac{(N - n_t)M}{N - n_0},$$

where M is the quantity of the items when the number of the item stored on the bearing body 101 reaches a maximum, $n_0$ is the quantity of the signal receiving units 30 that output the first magnitude when the number of the item stored on the bearing body 101 reaches the maximum, and N is a quantity of the signal receiving units 30 on the bearing body 101.

Still take the photoresistor as an example of the signal receiving unit 30, each photoresistor occupies an area of $S_R$, its resistance is R when no light illuminates the photoresistor. When the number of the item stored on the bearing body 101 reaches a maximum, the quantity of the photoresistors whose resistance is less than R (i.e., the quantity of the photoresistors which are illuminated with light and output the first magnitude) is no, then it can be calculated that when the number of the item stored on the bearing body 101 reaches the maximum, the quantity of the photoresistors shielded by the item is $N-n_0$, and the area of the shielded photoresistors is $S_R(N-n_0)$.

Assuming that the area of the shielded photoresistors is equal to the area occupied by the item on the bearing body 101, and the quantity of the items is M when the number of the item stored on the bearing body 101 reaches a maximum, the area $S_0$ occupied by each item can be calculated as $$S_0 = \frac{S_R(N - n_0)}{M}.$$

At any other moment of time, it can be detected that the quantity of the photoresistors whose resistance is less than R (i.e., the quantity of the photoresistors which are illuminated with light and output the first measure) is $n_t$, then the quantity $m_t$ of the item on the bearing body 101 at this time is $$m_t = \frac{S_R(N - n_t)}{S_0}.$$

By substituting $$m_t = \frac{S_R(N - n_t)}{S_0} \text{ in } S_0 = \frac{S_R(N - n_0)}{M},$$

the equation $$m_t = \frac{(N - n_t)M}{N - n_0}$$

can be obtained.

Based on this, it is only needed to know the quantity of the items M when the number of the item stored on the bearing body 101 reaches a maximum, the quantity $n_0$ of the signal receiving units 30 that output the first magnitude when the number of the item stored on the bearing body 101 reaches the maximum, the quantity N of the signal receiving units 30 on the bearing body 101, and the quantity $n_t$ of the signal receiving units 30 that output the first magnitude on the bearing body 101 at any time, then the quantity of items $m_t$ on the bearing body 101 at this time can be calculated.

It should be noted that, the above equation is derived by using photoresistor as an example of the signal receiving unit 30, but it can be seen from the derivation process that, the final result is only related to M, $n_0$, N and $n_t$, so the signal receiving unit 30 that is other devices also applies to this disclosure.

In addition, as can be seen from the above derivation, the calculation of S0 is premised on the equal area of the items on the bearing body 101, therefore, in practical applications, the same kind of items can be placed on the bearing body 101.

In addition, in the case that each item corresponds to a signal receiving unit 30, $M=(n-n_0)$ and $m_t=(n-n_t)$ can also be derived directly, that is, when the number of the item stored on the bearing body 101 reaches a maximum, the quantity of the items M of the item is equal to the quantity of the photoresistors shielded by the item ($N-n_0$), and at any time, the quantity $m_t$ of the item on the bearing body 101 equals the quantity N of the signal receiving units 30 on the bearing body 101 minus the quantity $n_t$ of the signal receiving units 30 that output the first magnitude on the bearing body 101 at this time.

In one or more embodiments of this disclosure, the method further comprises: after obtaining the quantity of the items stored on the bearing body 101 through calculation, comparing the quantity calculated at this time with the quantity before the tally action occurs this time, to obtain a change in the quantity of the items stored on the bearing body 101 after the occurrence of the tally action at this time.

The quantity of the items stored on the bearing body 101 before the occurrence of the tally action at this time is denoted as $m_q$, and the quantity of the items stored on the bearing body 101 calculated at this time is denoted as $m_t$, then there are the following three relations between $m_t$ and $m_q$:

$m_t > m_q$, which represents that an item is put into;
$m_t < m_q$, which represents that an item is taken out;
$m_t = m_q$, which represents that the quantity of the items stored is not changed or no item is put into or taken out.

The embodiments of this disclosure, by comparing the quantity calculated at this time with the quantity before the occurrence of the tally action at this time, can learn the change in the quantity of the items stored on the bearing body 101 before and after the tally action occurs.

In one or more embodiments of this disclosure, after obtaining the quantity of the items stored on the bearing body 101 through calculation, comparing the quantity calculated at this time with the quantity before the tally action occurs this time, to obtain a change in the quantity of the items stored on the bearing body 101 after the occurrence of the tally action at this time, comprising: after calculating the quantity of the items stored on the bearing body 101, comparing the quantity calculated at this time with an initial quantity, to obtain a change in the quantity of the items stored on the bearing body 101 after the occurrence of the tally action at this time, wherein the initial quantity is the quantity of the items stored on the bearing body 101 before the occurrence of the tally action at this time; and then assigning the quantity at this time to the initial quantity.

That is, the quantity of the items stored on the bearing body 101 calculated at each time is compared with the initial quantity, and the initial quantity used in the comparison at this time is assigned by the quantity of the items stored on the bearing body 101 calculated at the last time.

In one or more embodiments of this disclosure, the method further comprises: sending, by the communication module 70, the alarm information generated by the alarm module 60 to the mobile terminal.

By sending the alarm information to the mobile terminal, the staff can also get timely warning prompts even if they leave the work area, so that they can replenish the item timely.

In one or more embodiments of this disclosure, the method further comprises: sending the identification information identifying the goods shelf 10 and the quantity of the items stored on the goods shelf 10 to the mobile terminal.

Specifically, when goods shelf 10 is a multilayer goods shelf 10, unique identification information can be assigned to each layer of the goods shelf 10, and the identification information for each layer and the quantity of the items stored in that layer (i.e., the item on the bearing body 101 of that layer) are sent to the mobile terminal. Alternatively, unique identification information can be assigned to a goods shelf 10, and the identification information of the goods shelf 10 and the quantity of items stored on each layer of the goods shelf 10 (i.e., each bearing body 101) are sent to the mobile terminal. Alternatively, unique identification information can be also assigned to a goods shelf 10, and the identification information of the goods shelf 10 and the quantity of items stored on all layers of the goods shelf 10 (i.e., all bearing bodies 101) are sent to the mobile terminal.

Figure 10:
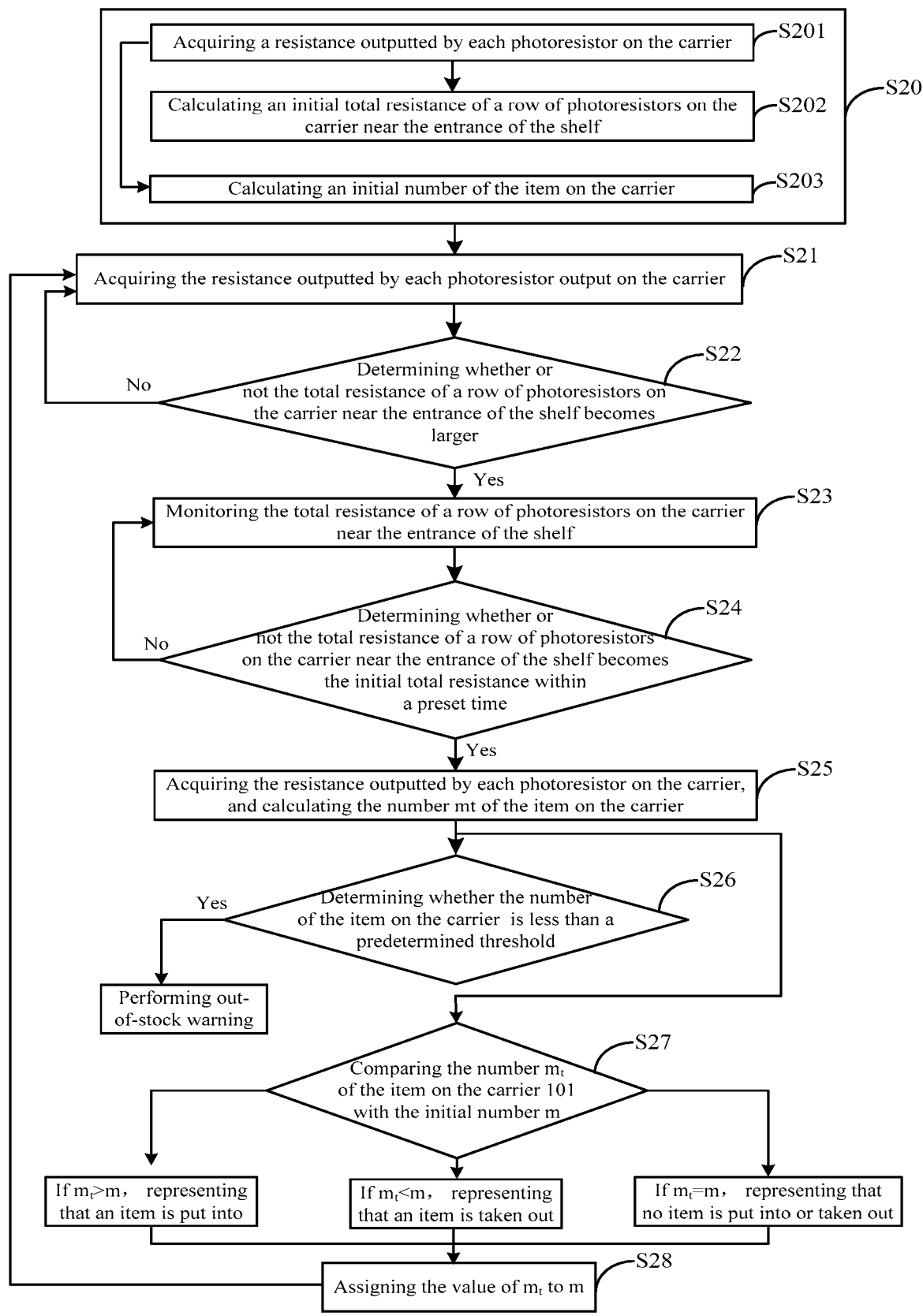
FIG. 10 is the second schematic diagram showing a flow of monitoring items of a goods shelf system provided by this disclosure.

The following provides a specific method of monitoring items of the goods shelf system, wherein the signal receiving unit 30 of the goods shelf system is a photoresistor. As shown in FIG. 10, the method comprises:

S20: Initializing.

In particular, initialization can be divided into three steps:

S201: acquire a resistance outputted by each photoresistor on the bearing body 101.

S202, calculate to obtain an initial total resistance of a row of photoresistors on the bearing body 101 near the entrance of the goods shelf 10.

S203, calculate an initial quantity (denoted as m) of the item on the bearing body 101. wherein S202 and S203 are based on the information obtained in S201.

The initial quantity of the items on the bearing body 101 can be calculated through the equation $$\frac{(N-n_t)M}{N-n_0},$$

where M, $n_0$, N are known, and the information acquired according to S201 can be counted to obtain the quantity of the photoresistors whose resistance is less than R, and the quantity is $n_t$.

It should be noted that the initialization requires no tally action in the goods shelf 10.

S21, acquiring the resistance outputted by each photoresistor output on the bearing body 101.

S22, determining whether or not the total resistance of a row of photoresistors on the bearing body 101 near the entrance of the goods shelf 10 becomes larger; if it becomes larger, then proceeding to S23, otherwise, proceeding to S21.

S23, monitoring the total resistance of a row of photoresistors on the bearing body 101 near the entrance of the goods shelf 10.

S24, determining whether or not the total resistance of a row of photoresistors on the bearing body 101 near the entrance of the goods shelf 10 becomes the initial total resistance within a preset time; if so, proceeding to S25; otherwise proceeding to S23.

If the total resistance does not become the initial total resistance within the preset time, an alarm can be issued through the alarm module 60 to enable the staff to confirm whether or not an item is placed on a row of photoresistors on the bearing body 101 near the entrance of the goods shelf 10.

S25, acquiring the resistance outputted by each photoresistor on the bearing body 101, and calculating the quantity $m_t$ of the item on the bearing body 101.

The quantity of the items on the bearing body 101 can be calculated through the equation $$m_t = \frac{(N-n_t)M}{N-n_0},$$

where M, $n_0$, N are known, and the information acquired according to S25 can be counted to obtain the quantity of the photoresistors whose resistance is less than R, and the quantity is $n_t$.

S26, determining whether the quantity $m_t$ of the item on the bearing body 101 is less than a predetermined threshold; if so, performing out-of-stock warning.

S27, comparing the quantity $m_t$ of the item on the bearing body 101 with the initial quantity m; if $m_t>m$, it represents that an item is put into; if $m_t<m$, it represents that an item is taken out; if $m_t=m$, it represents that no item is put into or taken out.

S28, assign the value of $m_t$ to m and repeat S21~s27.

The above merely are specific embodiments of this disclosure, but the scope of protection of this disclosure is not limited thereto, and any person skilled in the art would readily conceive of changes or substitutions within the technical scope revealed by this disclosure, and all these changes or substitutions shall fall within the scope of protection of this disclosure. Therefore, the scope of protection of this disclosure shall be determined by the scope of protection of the claims.

What is claimed is:

1. A goods shelf system comprising:
 a goods shelf comprising a bearing body for bearing items;
 a signal transmitting unit located on a side of the bearing body;
 a plurality of signal receiving units, located on the bearing body, for receiving a signal transmitted by the signal transmitting unit, wherein the signal receiving units output a first magnitude when the signal receiving units receive the signal transmitted by the signal transmitting unit, and output a second magnitude when the signal transmitted by the signal transmitting unit is shielded by the items on the bearing body; and
 a processing unit, electrically connected with the signal receiving units, for acquiring a storage state of the items on the bearing body according to a signal outputted by the signal receiving units,
 wherein the processing unit is configured to determine whether or not a tally action occurs by:
 acquiring the first magnitude or the second magnitude outputted by the signal receiving units in a preset area range on the bearing body near an entrance of the goods shelf, and summing the first magnitude or the second magnitude to obtain a total magnitude, the first magnitude outputted by the signal receiving units in the preset area range indicates that a tally device is not sensed in the goods shelf, and the second magnitude outputted by the signal receiving units in the preset area range indicates that a tally device enters the goods shelf;
 determining whether or not a tally action occurs according to a result of comparison between the total magnitude and an initial total magnitude; and
 calculating the quantity of the items stored on the bearing body according to the signal outputted by the signal receiving units when the processing unit determines that a tally action occurs.

2. The goods shelf system according to claim 1, wherein the signal transmitting unit comprises a signal transmitting plate, the signal transmitting plate is disposed opposite to the bearing body.

3. The goods shelf system according to claim 2, wherein the signal receiving units is a photosensitive element; the signal transmitting unit is an optical signal transmitting unit.

4. The goods shelf system according to claim 3, wherein the signal transmitting plate is a light guide plate; the signal transmitting unit further comprises a light source disposed on a side of the light guide plate.

5. The goods shelf system according to claim 1, further comprising an alarm module electrically connected with the processing unit, and the alarm module is configured to generate alarm information when a quantity of the items stored is less than a predetermined threshold.

6. The goods shelf system according to claim 5, wherein the goods shelf system further comprises a communication module for sending the alarm information to a mobile terminal.

7. The goods shelf system according to claim 6, wherein the communication module is further used for sending identification information identifying the goods shelf and the quantity of the items stored on the goods shelf to the mobile terminal.

8. The goods shelf system according to claim 2, wherein the goods shelf further comprises a bracket disposed between the bearing body and the signal transmitting plate, the bearing body and the signal transmitting plate are fixed by the bracket.

9. The goods shelf system according to claim 2, wherein the bearing body comprises a support and a circuit board; the signal receiving units are disposed on the circuit board, and the circuit board is disposed on a side of the support away from the signal transmitting plate.

10. The goods shelf system according to claim 1, wherein there are a plurality of signal receiving units arranged on the bearing body in an array.

11. The goods shelf system according to claim 1, wherein the bearing body is a plate-shaped bearing body or a mesh-shaped bearing body.

12. A method of monitoring items of a goods shelf system comprising: a goods shelf comprising a bearing body for bearing items; a signal transmitting unit located on a side of the bearing body; a plurality of signal receiving units, located on the bearing body, for receiving a signal transmitted by the signal transmitting unit; and a processing unit, electrically connected with the signal receiving units, for acquiring a storage state of the item on the bearing body according to a signal outputted by the signal receiving units, the method comprises:
 outputting a first magnitude to the processing unit when the signal receiving units receive the signal transmitted by the signal transmitting unit, and outputting a second magnitude to the processing unit when the signal transmitted by the signal transmitting unit is shielded by the items on the bearing body; and
 acquiring, by the processing unit, the storage state of the item on the bearing body of the goods shelf according to the signal outputted by the signal receiving units,
 wherein acquiring, by the processing unit, the storage state of the item on the bearing body of the goods shelf according to the signal outputted by the signal receiving units comprises:
 after the processing unit determines that a tally action occurs, calculating the quantity of the items stored on the bearing body according to the signal outputted by the signal receiving units,
 determining whether or not a tally action occurs comprises:
 acquiring the first magnitude or the second magnitude outputted by the signal receiving units in a preset area range on the bearing body near an entrance of the goods shelf, the first magnitude outputted by the signal receiving units in the preset area range indicates that a tally device is not sensed in the goods shelf, and the second magnitude outputted by the signal receiving units in the preset area range indicates that a tally device enters the goods shelf;
 summing the first magnitude or the second magnitude to obtain a total magnitude; and
 determining whether or not a tally action occurs according to a result of comparison between the total magnitude and an initial total magnitude.

13. The method according to claim 12, wherein the goods shelf system further comprises an alarm module electrically connected with the processing unit; the method further comprising: when a quantity of the items stored is less than a predetermined threshold, generating, by the alarm module, alarm information.

14. The method according to claim 12, further comprising:
 acquiring, before the tally action, the first magnitude outputted by the signal receiving units in the preset area range on the bearing body near the entrance of the goods shelf, to obtain the initial total magnitude.

15. The method according to claim 12, wherein acquiring, by the processing unit, the storage state of the item on the bearing body of the goods shelf according to the signal outputted by the signal receiving units comprises:

after the processing unit determines that a tally action occurs, calculating a quantity of the items stored on the bearing body according to the signal outputted by the signal receiving units; and determining whether or not a tally action occurs comprises:

determining whether or not a tally action occurs according to a change trajectory of the signal receiving units that output the second magnitude on the bearing body.

16. The method according to claim 12, further comprising calculating a quantity of the items stored on the bearing body comprises:

acquiring a quantity $n_t$ of the signal receiving units that output the first magnitude on the bearing body;

calculating the quantity $m_t$ of the item stored on the bearing body through the equation $$m_t = \frac{(N - n_t)M}{N - n_0},$$

where M is the quantity of the items when the number of the items stored on the bearing body reaches a maximum, no is a quantity of the signal receiving units that output the first magnitude when the number of the item stored on the bearing body reaches the maximum, and N is a quantity of the signal receiving units on the bearing body.

17. The method according to claim 13, wherein the goods shelf system further comprises a communication module and the method further comprising: sending, by the communication module, the alarm information generated by the alarm module to a mobile terminal.

18. The method according to claim 17, further comprising: sending the identification information identifying the goods shelf and the quantity of the items stored on the goods shelf to the mobile terminal.

* * * * *

UNITED STATES PATENT AND TRADEMARK OFFICE
CERTIFICATE OF CORRECTION

PATENT NO. : 11,308,443 B2
APPLICATION NO. : 16/336707
DATED : April 19, 2022
INVENTOR(S) : Wei Deng et al.

Page 1 of 1

It is certified that error appears in the above-identified patent and that said Letters Patent is hereby corrected as shown below:

In the Claims

Column 18, Line 8, Claim 16, delete "no" and insert -- $n_0$ --

Signed and Sealed this
Twenty-first Day of June, 2022

Katherine Kelly Vidal
*Director of the United States Patent and Trademark Office*